United States Patent
Fathalla et al.

(10) Patent No.: US 11,783,067 B2
(45) Date of Patent: Oct. 10, 2023

(54) SETTING MODIFICATION PRIVILEGES FOR APPLICATION INSTANCES

(71) Applicant: Microsoft Technology Licensing, LLC, Redmond, WA (US)

(72) Inventors: Diaa Eldin Mohamed Hazem Fathalla, Redmond, WA (US); Surender Kumar, Redmond, WA (US); Jason Daniel Shay, Seattle, WA (US); Michael S. Murstein, Bellevue, WA (US); Jose J Figueroa-Morales, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 17/153,797

(22) Filed: Jan. 20, 2021

(65) Prior Publication Data
US 2022/0114274 A1  Apr. 14, 2022

Related U.S. Application Data

(60) Provisional application No. 63/091,214, filed on Oct. 13, 2020.

(51) Int. Cl.
*G06F 21/62* (2013.01)
*G06F 16/176* (2019.01)

(52) U.S. Cl.
CPC ...... *G06F 21/6218* (2013.01); *G06F 16/1774* (2019.01)

(58) Field of Classification Search
CPC ............... G06F 21/6218; G06F 21/604; G06F 21/6209; G06F 16/1774; G06F 2221/2147
See application file for complete search history.

(56) References Cited

U.S. PATENT DOCUMENTS 7,962,458 B2   6/2011   Holenstein et al.
8,352,658 B2   1/2013   Tarta et al.
(Continued)

OTHER PUBLICATIONS

"International Search Report and Written Opinion Issued in PCT Application No. PCT/US2021/048109", dated Nov. 26, 2021, 11 Pages.
(Continued)

*Primary Examiner* — Han Yang
(74) *Attorney, Agent, or Firm* — WORKMAN NYDEGGER

(57) ABSTRACT

A first server computing device, including a processor configured to receive, from a first application instance, a first access request for a file. The first access request may include a first modification privilege request and a modification privilege sharing request. The processor may determine that the file is not locked for editing and grant the first application instance access to the file with modification privileges indicated by the first modification privilege request and without modification privilege sharing permissions indicated by the modification privilege sharing request. The processor may set the file to be locked for editing. The processor may receive, from a second application instance, a second access request including a second modification privilege request. The processor may determine that the file is locked for editing and deny the second application instance access to the file.

20 Claims, 12 Drawing Sheets

(56) References Cited

U.S. PATENT DOCUMENTS

| | | | |
|---|---|---|---|
| 8,924,370 | B2 | 12/2014 | Shadmon |
| 2005/0289143 | A1 | 12/2005 | Oshri et al. |
| 2005/0289152 | A1 | 12/2005 | Earl et al. |
| 2009/0282462 | A1* | 11/2009 | Skaria ................. G06F 16/93 726/3 |
| 2010/0023519 | A1* | 1/2010 | Kailash ................. G06F 9/52 707/E17.007 |
| 2015/0248434 | A1 | 9/2015 | Avati et al. |
| 2019/0012053 | A1* | 1/2019 | Hawa ................. G06F 3/0484 |
| 2019/0188399 | A1* | 6/2019 | Palaniappan ......... H04L 9/3239 |

OTHER PUBLICATIONS

"Azure Cosmos DB Pricing", Retrieved From: https://web.archive.org/web/20200907081142/https://azure.microsoft.com/en-us/pricing/details/cosmos-db/, Sep. 7, 2020, 13 Pages.

"Distributed Lock Manager", Retrieved From: https://web.archive.org/web/20201203224251/https://en.wikipedia.org/wiki/Distributed_lock_manager, Dec. 3, 2020, 5 Pages.

Wong, et al., "Oracle Streams: A High Performance Implementation for Near Real Time Asynchronous Replication", In Proceedings of 25th International Conference on Data Engineering, Mar. 29, 2009, 12 Pages.

\* cited by examiner

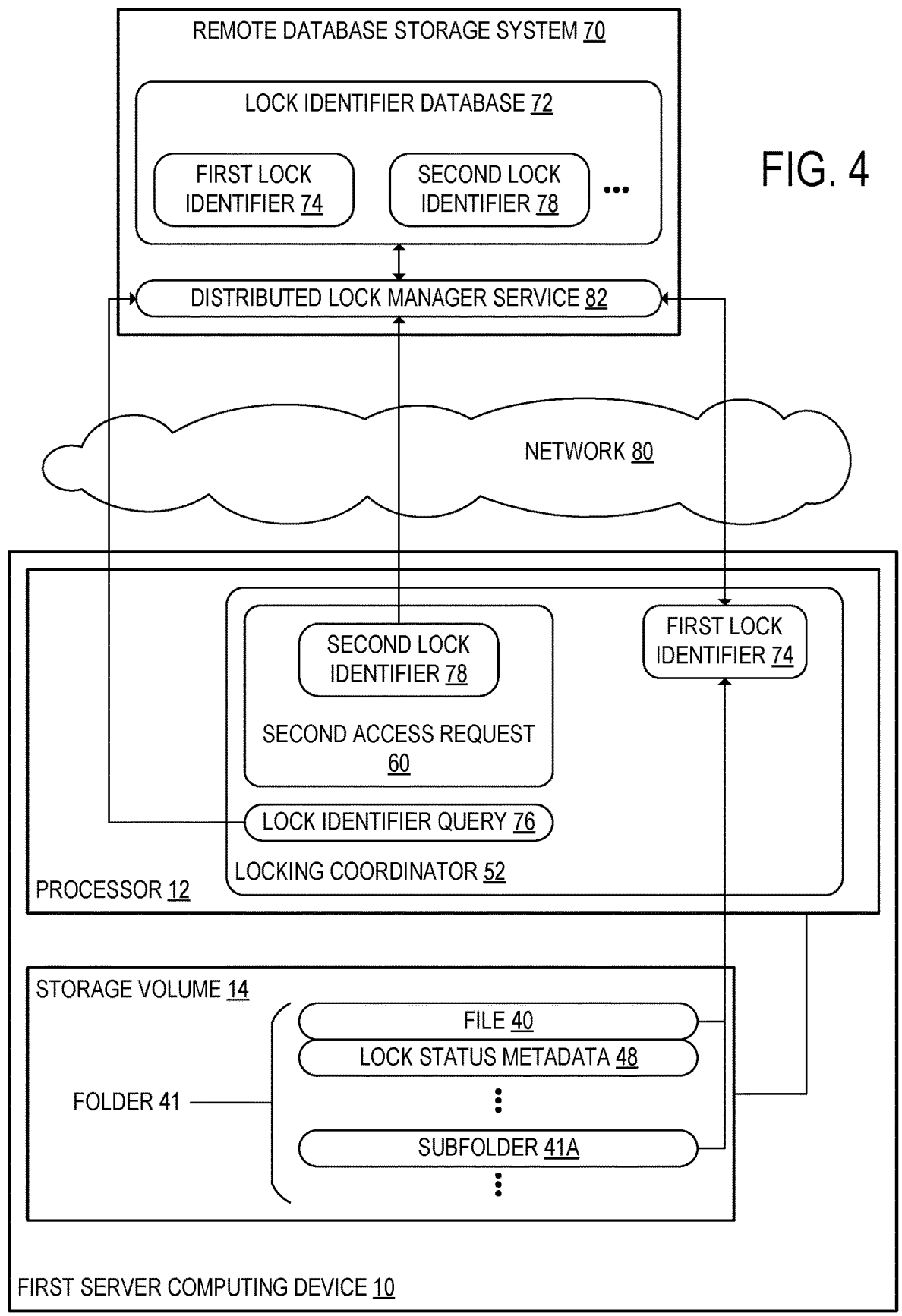

SETTING MODIFICATION PRIVILEGES FOR APPLICATION INSTANCES

CROSS REFERENCE TO RELATED APPLICATIONS

This application claims priority to U.S. Provisional Patent Application Ser. No. 63/091,214, filed Oct. 13, 2020, the entirety of which is hereby incorporated herein by reference for all purposes.

BACKGROUND

In a distributed file management system, files may be opened and edited at multiple different computing devices that may communicate with each other over a network. For example, a file may be stored at a data center that provides other computing devices with access to the file as a cloud-based service. Changes made to the file at one computing device may be propagated to other computing devices that access the file. In some distributed file management systems, synchronous replication is used, in which the file may only be opened at one computing device at a time. Alternatively, asynchronous replication may be used, in which a file may be opened concurrently at multiple computing devices.

SUMMARY

According to one aspect of the present disclosure, a first server computing device is provided, including a processor configured to receive, from a first application instance executed at a second server computing device, a first access request for a file stored in a storage volume. The first access request may include a first modification privilege request and a modification privilege sharing request. The processor may be further configured to determine that the file is not locked for editing. In response to determining that the file is not locked for editing, the processor may be further configured to grant the first application instance access to the file with modification privileges indicated by the first modification privilege request and without modification privilege sharing permissions indicated by the modification privilege sharing request. The processor may be further configured to set the file to be locked for editing in response to granting the first application instance access to the file. The processor may be further configured to receive, from a second application instance executed at a third server computing device, a second access request including a second modification privilege request. Subsequently to receiving the second access request, the processor may be further configured to determine that the file is locked for editing. The processor may be further configured to deny the second application instance access to the file.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows the first server computing device and a remote database storage system with which the first server computing device may communicate over a network, according to the configuration of FIG. 1.

DETAILED DESCRIPTION

Figure 1:
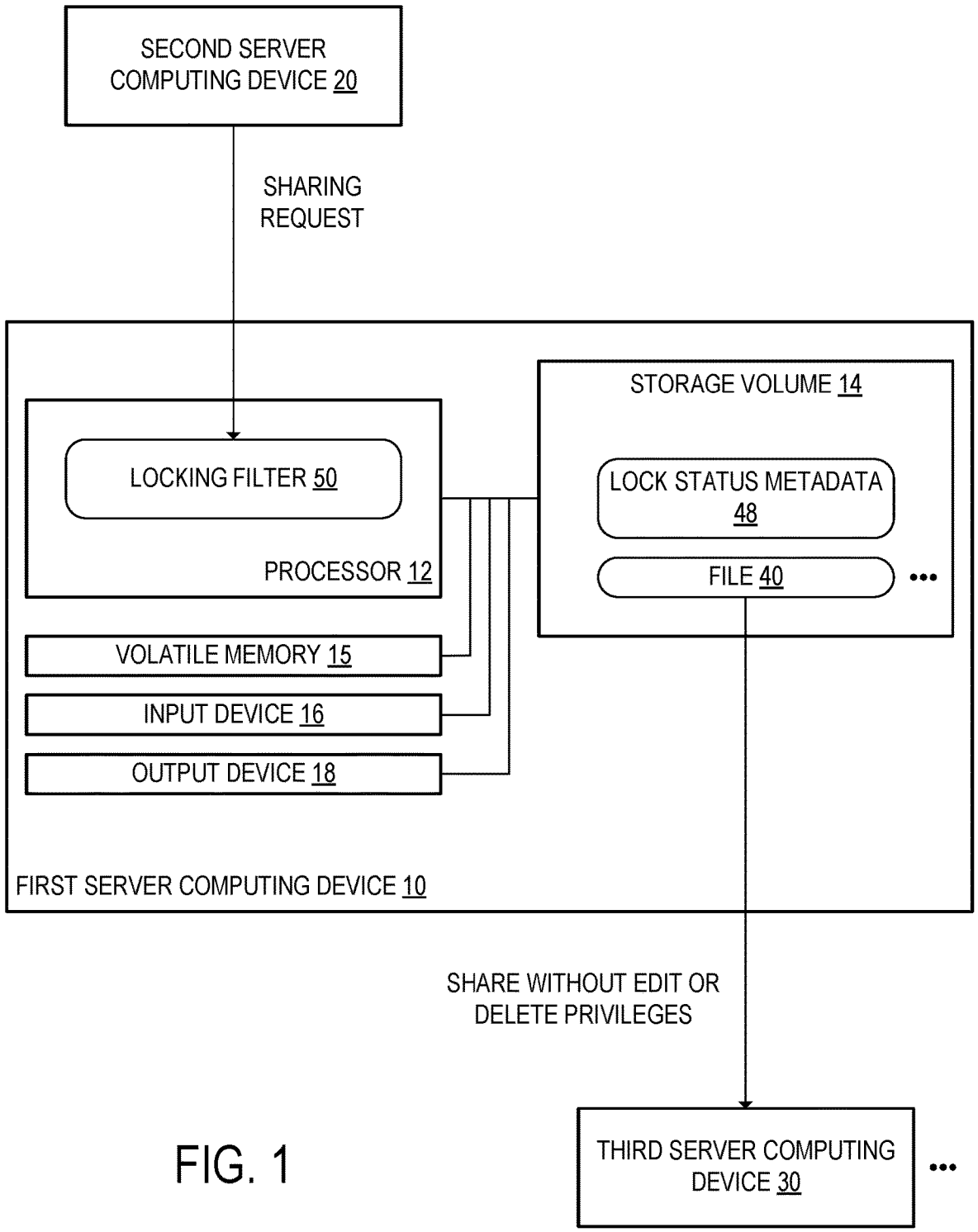
FIG. 1 schematically shows an example first server computing device that may be configured to communicate with a second server computing device and a third server computing device when implementing a distributed file management system, according to one example configuration.

In a distributed file management system as discussed above, a technique referred to as file replication can be used to concurrently store local copies of a file in multiple locations at multiple computing devices, and mirror changes made in one copy of the file to all other associated copies of the file. File replication can be applied to groups of servers, such as servers configured as a cloud platform that stores files and users to access copies of the files over an Internet connection.

In such a server-based distributed file management system, multiple copies of each file can be stored on different servers of the cloud platform. By storing a local copy of the file, servers can access the file more quickly and avoid the additional latency and bandwidth consumption that would be required to open the file across an Internet or other network connection. If changes are made to a local copy of the file by a first user at a particular server computing device, those changes may be propagated to other copies of that file on other server computing devices. In this way, each local copy of the file at each server computing device is kept current, to reflect the most recent updates to the local copy of the file at any other computing device.

One challenge that arises in such systems is concurrent access to files. In some distributed file management systems, synchronous replication is used, in which the file may only be opened by one user at one computing device at a time. While this avoids data conflicts, it also presents a barrier to access, potentially slowing down workflows.

Alternatively, asynchronous replication may be used, in which a file may be opened and edited concurrently at multiple computing devices and/or by multiple users. While asynchronous replication can afford productivity advantages by not forcing users to wait for access to open files, asynchronous replication can cause conflicts between different sets of modifications to a file to occur when the file is concurrently modified at two or more computing devices. When the users of the two or more computing devices save their changes to the file, one or more sets of changes made by those users may be overwritten or may fail to be applied. In this case, data may be lost, or one of both of these users may be forced to save the file as a new file in order to avoid losing modifications. The potential for data loss is a serious challenge facing systems that allow asynchronous replication.

In order to address the above challenges, a cloud based distributed file system with both an asynchronous replication service and a distributed lock manager may be used, as discussed below. The distributed lock manager may permissively prevent conflicts by allowing users access to files that are opened by other users, while trimming the permissions of an application instance to share a file with edit or delete privileges, for example. In such an example, although full read and edit privileges and the ability to share the file with read and edit privileges may have been requested by a first user when opening the file, a second user with whom the first user shares the file is not granted all the privileges that the first user requests. Instead, in such an example, the second user is granted read privileges but not edit privileges. Thus, access to a file may be quickly granted to the second user. However, when the first user tries to share the file with edit or delete privileges, the distributed lock manager may prevent the sharing operation due to lack of write sharing privileges.

According to one embodiment of the present disclosure, a first server computing device 10 is provided, as shown in the example of FIG. 1. The first server computing device 10 may include a processor 12. In addition, the first server computing device 10 may include a storage volume 14, which may include one or more non-volatile memory devices, and may further include volatile memory 15. The storage volume 14 and the volatile memory 15 may be configured to store data that is processed at the processor 12. The first server computing device 10 may further include one or more input devices 16 and one or more output devices 18 via which the processor 12 may be configured to communicate with a user or with one or more other computing devices.

The first server computing device 10 may be instantiated as a single physical computing device or may alternatively be instantiated as a virtual computing device in which the functions of the first server computing device 10 are distributed between a plurality of physical computing devices. In some examples, the first server computing device 10 may be located in a data center and included in a computing fabric of a plurality of communicatively coupled physical computing devices at which one or more virtual computing devices may be implemented.

The storage volume 14 of the first server computing device 10 may store a file 40 along with metadata associated with the file 40. The metadata associated with the file 40 may, for example, include lock status metadata 48, which may indicate whether the file 40 is locked such that one or more computing devices are unable to modify the file 40.

As shown in the example of FIG. 1, the first server computing device 10 may be configured to receive a sharing request from a second server computing device 20 and may be further configured to grant a third server computing device 30 access to the file 40 in response to the sharing request. Similarly to the first server computing device, the second server computing device 20 and the third server computing device 30 may each be instantiated as a physical computing device or as a virtual computing device. In some examples, the sharing request may be a request to share the file with a plurality of third server computing devices 30. As discussed in further detail below, a locking filter 50 executed at the processor 12 may determine based on the lock status metadata 48 that the third server computing device 30 does not have write permissions for the file 40 and may accordingly prevent the third server computing device 30 from opening the file 40. Alternatively, the locking filter 50 may allow the third server computing device 30 to access the file 40 without being able to edit or delete the file 40.

Figure 2A:
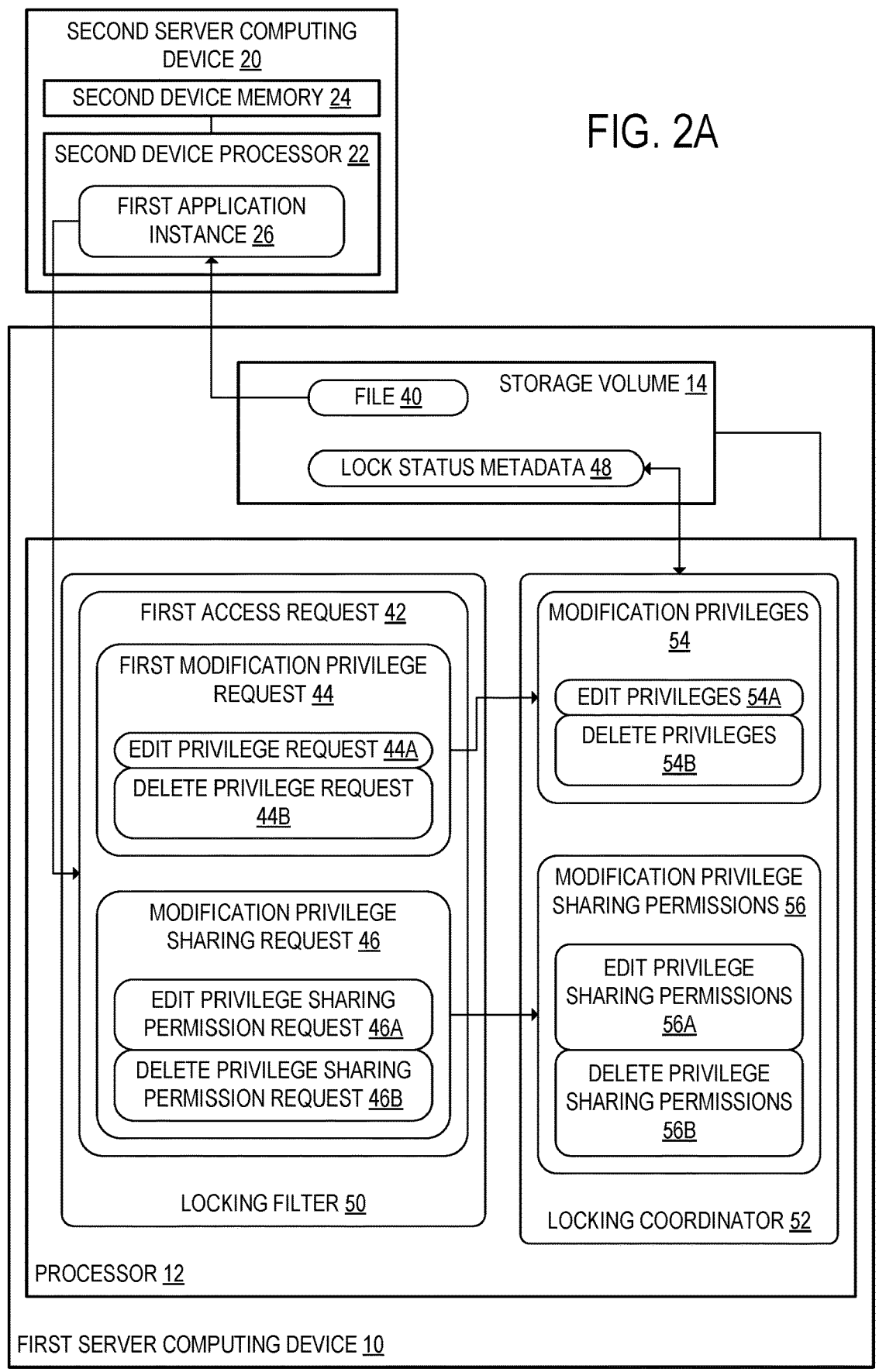
FIG. 2A schematically shows the first server computing device and the second server computing device when the first server computing device receives a first access request including a first modification privilege request and a modification privilege sharing request, according to the configuration of FIG. 1.

FIG. 2A shows the example first server computing device 10 of FIG. 1 in additional detail when the first server computing device 10 receives requests from the second server computing device 20. The processor 12 may be configured to receive a first access request 42 for the file 40 stored in the storage volume 14. The first access request 42 may be received from a first application instance 26 executed at a second server computing device 20. As shown in the example of FIG. 2A, the second server computing device 20 may be a remote computing device including a second device processor 22 and second device memory 24. The first application instance 26 may be executed at the second device processor 22.

The processor 12 may be configured to receive the first access request 42 at a locking filter 50. The locking filter 50 may be configured to convey the first access request to a locking coordinator 52 at which permissions of computing devices to access and modify the file 40 may be checked. The first access request 42 may include a first modification privilege request 44 for modification privileges 54 to be granted to the first application instance 26 executed at the second server computing device 20. The first modification privilege request 44 may include an edit privilege request 44A to receive edit privileges 54A for the file 40. Additionally or alternatively, the first modification privilege request 44 may include a delete privilege request 44B to receive delete privileges 54B for the file 40. When the first application instance 26 has edit privileges 54A, the first application instance 26 is able to transmit, to the first server computing device 10, one or more edits to the file 40 that are saved at the storage volume 14. Thus, when the first application instance 26 has the edit privileges 54A, edits made at the first application instance 26 may be propagated to other computing devices that access the file 40. When the first application instance 26 has the delete privileges 54B, the first application instance 26 is able to transmit, to the first server computing device 10, instructions to delete the file 40 from the storage volume 14, and the processor 12 is configured to delete the file 40 from the storage volume 14 in response to receiving those instructions.

In addition to the first modification privilege request 44, the first access request 42 may further include a modification privilege sharing request 46. The modification privilege sharing request 46 may indicate one or more modification privilege sharing permissions 56. For example, the modification privilege sharing request 46 may include an edit privilege sharing permission request 46A for edit privilege sharing permissions 56A. Additionally or alternatively, the modification privilege sharing request 46 may include a delete privilege sharing permission request 46B for delete privilege sharing permissions 56B. Thus, the first application instance 26 may request permission to share the modification privileges 54 with one or more other application instances.

When the processor 12 receives the first access request 42, the processor 12 may be further configured to determine whether the file 40 is locked for editing. When a file 40 is locked for editing, the lock status metadata 48B for that file 40 may indicate that the file 40 is checked out for editing by another computing device. Thus, in some examples, the file 40 may be opened without the edit privileges 54A or the delete privileges 54B, even if the first application instance 26 would otherwise have edit privileges 54A or delete privileges 54B for the file 40. Alternatively, the first application instance 26 may be prevented from accessing the file 40 when the file 40 is indicated as locked.

When the processor 12 determines that the file 40 is not locked for editing, the processor 12 may be further configured to grant the first application instance 26 access to the file 40 with modification privileges 54 indicated by the first modification privilege request 44. However, the processor 12 may be configured to grant the first application instance 26 access to the file 40 without modification privilege sharing permissions 56 indicated by the modification privilege sharing request 46. In some examples, a copy of the file 40 may be transmitted to the second server computing device 20 when access is granted to the file 40. Alternatively, an interactable representation of at least a portion of the file 40 may be transmitted to the second server computing device 20. The processor 12 may be further configured receive an indication of an interaction with the interactable representation made at the first application instance 26 and modify the file 40 stored in the storage volume 14 based on the indication of the interaction.

Figure 2B:
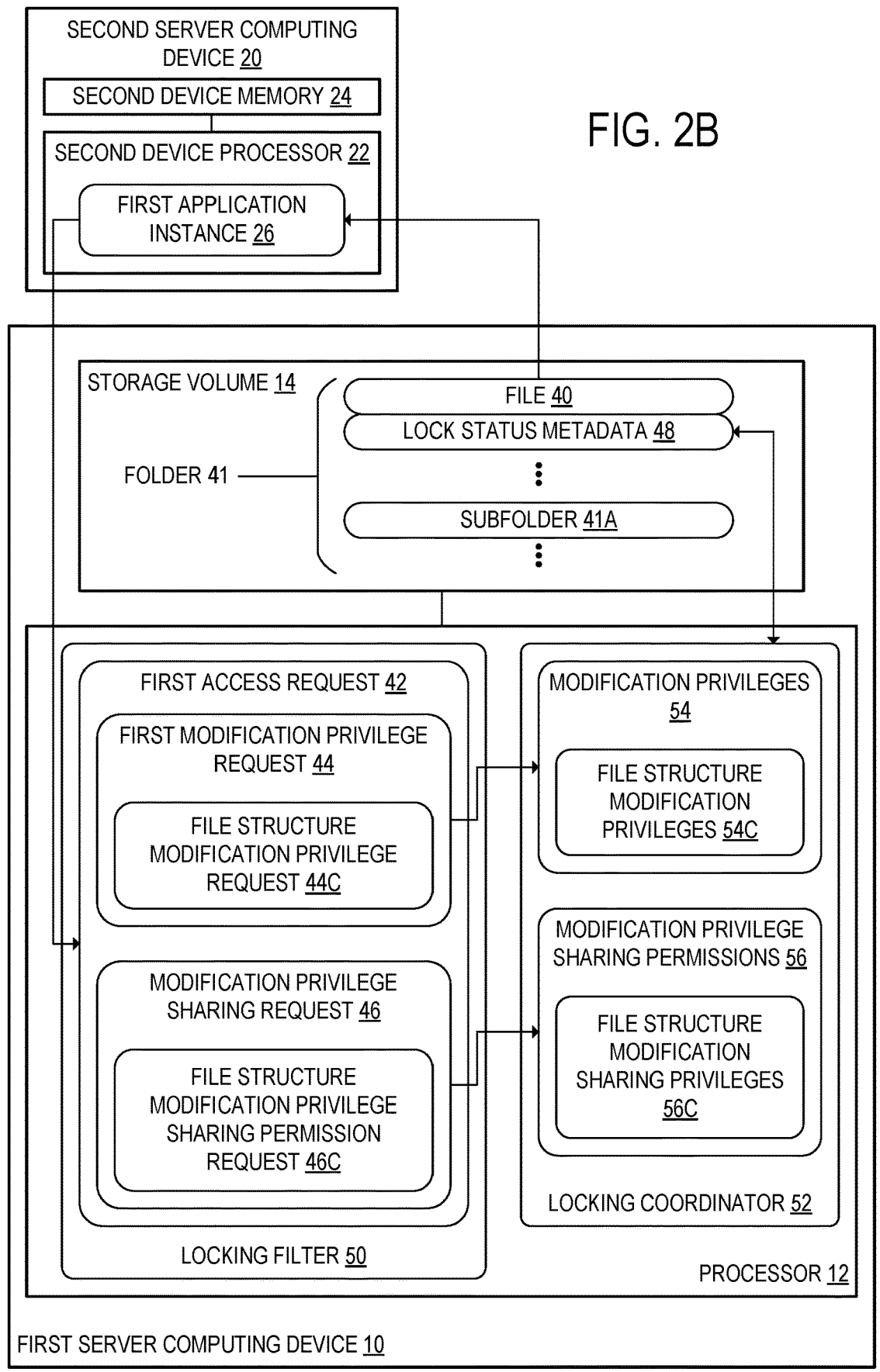
FIG. 2B shows the first server computing device and the second server computing device when the first access request includes a file structure modification privilege request, according to the configuration of FIG. 1.

Although, in the above examples, the processor 12 receives a first access request 42 for a file 40, the processor 12 may additionally or alternatively receive a first access request 42 for a folder 41 including one or more files 40, as shown in the example of FIG. 3. The folder 41 may additionally or alternatively include one or more subfolders 41A, each of which may in turn include one or more files 40 and/or subfolders 41A. In the example of FIG. 2B, additionally or alternatively to the edit privilege request 44A and the delete privilege request 44B, the processor 12 may be further configured to receive a file structure modification privilege request 44C from the first application instance 26. The processor 12 may, in response to receiving the file structure modification privilege request 44C and determining that the file 40 is not locked for editing, grant first application instance 26 file structure modification privileges 54C to modify a file structure of the folder 41. Some examples of modifications to the file structure of the folder 41 are creating a subfolder 41A, deleting a subfolder 41A, moving a file into or out of a subfolder 41A, and merging two or more subfolders 41A. Other modifications to the file structure of the folder 41 may be performed in other examples.

In some examples, the processor 12 may be further configured to check the lock status metadata 48B for one or more other files or folders stored in the same folder 41 as the file 40. In such examples, the processor 12 may be further configured to grant the first application instance 26 the file structure modification privileges 45C may be granted when none of the other files or folders stored in the same folder 41 as the file 40 are locked for editing. The processor 12 may be further configured to deny the first application instance 26 the file structure modification privileges 54C when at least one of the other files or folders is locked for editing.

In some examples, the modification privilege sharing request 46 may further include a file structure modification privilege sharing permission request 46C for permission to allow other application instances to modify the file structure of the folder 41 in which the file 40 is located. In such examples, the modification privilege sharing permissions 56 requested by the first application instance include file structure modification sharing privileges 56C. The processor 12 may be configured to grant the first application instance 26 access to the file 40 without the granting the first application instance 26 the file structure modification privilege sharing permissions 56C indicated by the file structure modification privilege sharing permission request 46C.

Returning to FIG. 2A, the processor 12 may be further configured to set the file 40 to be locked for editing in response to granting the first application instance 26 access to the file 40. When the file 40 is set to be locked for editing, the lock status metadata 48B for the file 40 may be updated to indicate that the file 40 is locked.

Figure 3A:
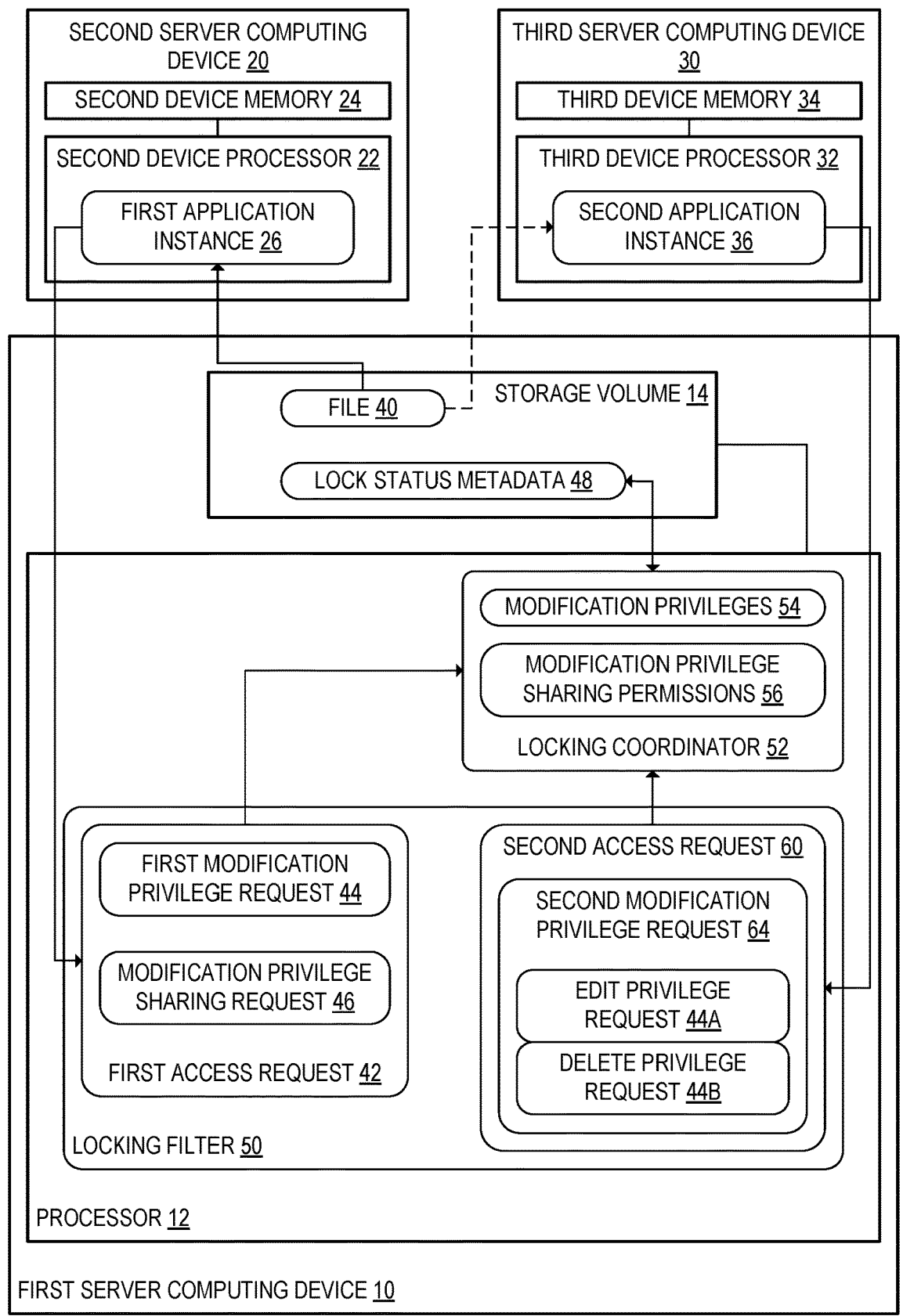
FIG. 3A schematically shows the first server computing device, the second server computing device, and the third server computing device when the first server computing device receives a second access request from the third server computing device, according to the configuration of FIG. 1.

Turning now to FIG. 3A, the processor 12 may be further configured to receive a second access request 60 to access the file 40 from a second application instance 36 executed at a third server computing device 30. As shown in FIG. 3A, the second application instance 36 may be executed at a third device processor 32 included in the third server computing device 30. The third server computing device 30 may further include third device memory 34 coupled to the third device processor 32. The second access request 60 may include a second modification privilege request 64 for modification privileges 54. For example, the second modification privilege request 64 may include a request for edit privileges 54A or delete privileges 54B to be granted to the second application instance 36.

Subsequently to receiving the second access request 60, the processor 12 may be further configured to determine that the file 40 is locked for editing. This determination may be made at least in part by referring to the lock status metadata 48. In response to determining that the file 40 is locked for editing, the processor 12 may be further configured to deny the second application instance 36 access to the file. The processor 12 may, for example, be configured to deny a second access request 60 made by the second application instance 36 for both read privileges and edit privileges 54A but allow a request for only read privileges.

In some examples, the processor 12 may be further configured to transmit a notification to the third server computing device 30 indicating that an invalid access mode has been selected when the processor 12 denies the second application instance 36 access to the file 40. Thus, the user of the third server computing device 30 may be notified that the file 40 is unavailable for editing. The notification may, for example, prompt the user of the third server computing device 30 to attempt to open the file 40 at a later time or in read-only mode.

In examples in which the processor 12 grants the second application instance 36 access to the file 40, the processor 12 may be configured to do so without granting the modification privileges 54 to the second application instance 36. For example, when the processor 12 receives a second access request 60 from the second application instance 36 to access the file 40 with both read privileges and edit privileges 54A, but the lock status metadata 48 indicates that the file 40 is locked for editing at the second server computing device 20, the processor 12 may be configured to grant the second application instance 36 access to the file 40 in read-only mode rather than with both reading and editing enabled.

According to one example, the first application instance 26 executed at the first server computing device 20 may first request read privileges, edit privileges 54A, read privilege sharing permissions, and edit privilege sharing permissions 56A for a file 40 from the first server computing device 10. The processor 12 of the first server computing device 10 may grant the first application instance 26 read privileges, edit privileges 54A, and read privilege sharing permissions upon determining that the file 40 is not locked for editing, without granting the first application instance 26 the edit privilege sharing permissions 56A. The processor 12 of the first server computing device 10 may subsequently receive, from a second application instance 36 executed at the third server computing device 30, a second access request 60 for read privileges and edit privileges 56A for the same file 40. The processor 12 may be further configured to prevent the second application instance 36 from opening the file 40 with the requested privileges in response to determining that the file 40 is open at the second server computing device 20. The processor 12 may be further configured to convey a notification to the third server computing device 30 indicating that the request for read privileges and edit privileges has been denied 54A.

Figure 3B:
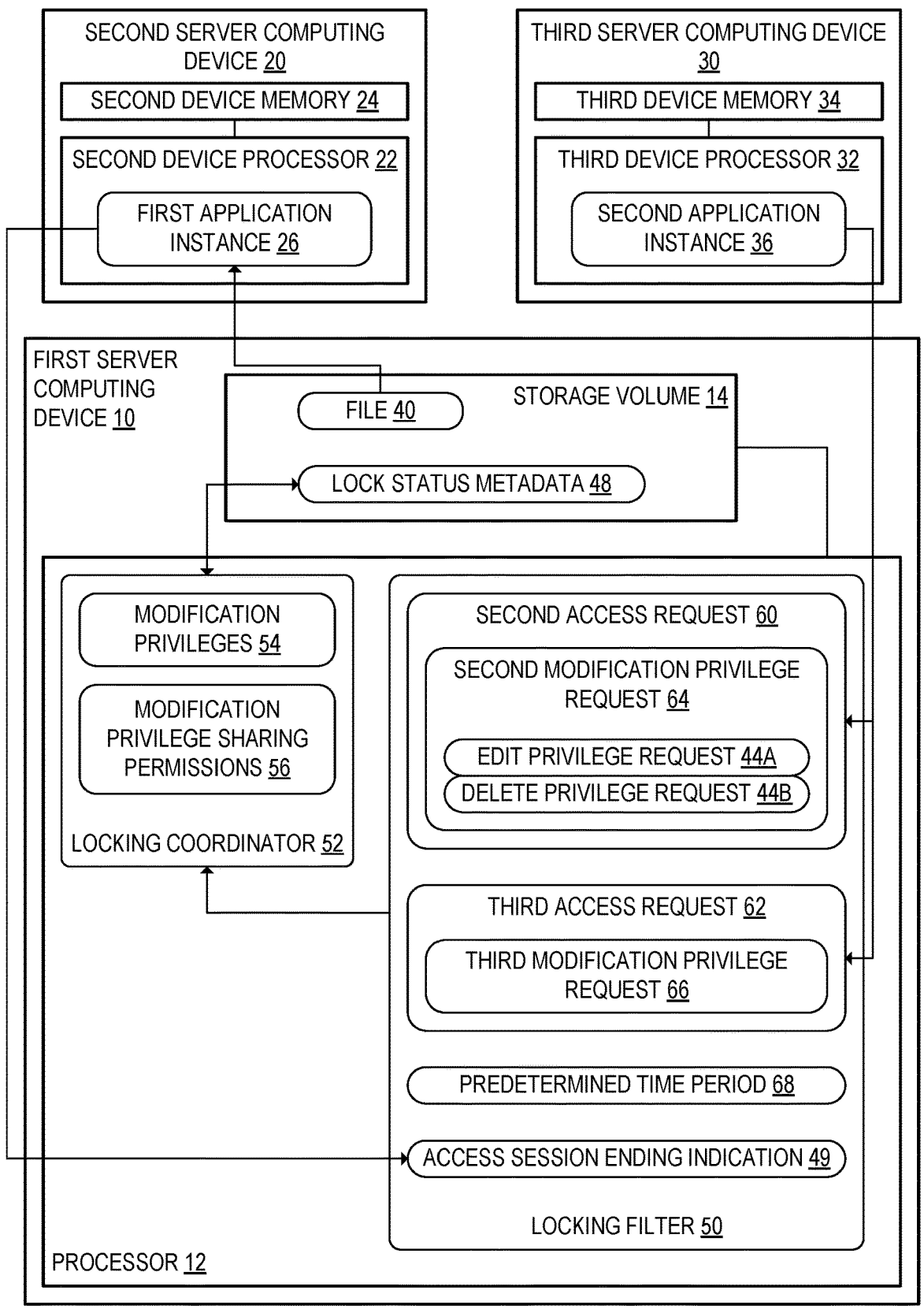
FIG. 3B schematically shows the first server computing device, the second server computing device, and the third server computing device when the first server computing device receives a third access request from the third server computing device within a predetermined time period of the second access request, according to the configuration of FIG. 1.

In some examples, as shown in FIG. 3B, the processor 12 may be further configured to receive, from the second application instance 36, a third access request 62 including a third modification privilege request 66 for the file 40. The processor 12 may be further configured to determine that the third access request 62 was received within a predetermined time period 68 of the determination that the file 40 is locked for editing. When the third access request 62 is received within the predetermined time period 68 of the determination that the file 40 is locked for editing, the processor 12 may be further configured to deny the second application instance 36 access to the file 40. Thus, the processor 12 may avoid having to query the storage volume 14 in response to attempts to open files that have recently been determined to be locked.

In some examples, as shown in the example of FIG. 4, the processor 12 may be further configured to assign a first lock identifier 74 to the file 40 at the locking coordinator 52. The first lock identifier 74 may be a globally unique identifier (GUID), and may, for example, be generated based on a file name of the file 40 and a folder GUID of the folder 41 in which the file 40 is located. By using the file name and folder GUID to generate the first lock identifier 74, the processor 12 may prevent multiple files from having the same name and file system location. The processor 12 may be further configured to transmit the first lock identifier 74 over a network 80 to a remote database storage system 70. The remote database storage system 70 may store a lock identifier database 72 that includes a plurality of lock identifiers. In addition to the first lock identifier 74, the processor 12 may also transmit an instruction to mark the file 40 as locked to the remote database storage system 70. For example, the processor 12 may be configured to convey the lock status metadata 48 to the remote database storage system 70. The remote database storage system 70 may include a distributed lock manager service 82 via which the remote database storage system 70 may be configured to interface with the locking coordinator 52.

In some examples, the second access request 60 may include a second lock identifier 78 indicating the file 40 to which modification is requested. When the processor 12 determines whether the file 40 is locked for editing, the processor 12 may be configured to make this determination at least in part by transmitting, to the remote database storage system 70, a lock identifier query 76 including the second lock identifier 78. The lock identifier query 76 may be a query for whether any currently locked file has a lock identifier that matches the second lock identifier 78. The processor 12 may be further configured to receive, from the remote database storage system 70, an indication that the second lock identifier 78 matches the first lock identifier 74.

Returning to FIG. 3B, the processor 12 may be further configured to receive, from the second server computing device 20, an access session ending indication 49 that an access session in which the first application instance 26 accessed the file 40 has ended. The access session ending indication 49 may be received at the locking filter 50. In response to receiving the access session ending indication 49, the processor 12 may be further configured to set the file 40 to be unlocked. Setting the file 40 to be unlocked may include modifying the lock status metadata 48. In some examples, the processor 12 may be further configured to transmit an instruction to mark the file 40 as unlocked to the remote database storage system 70.

Figure 5:
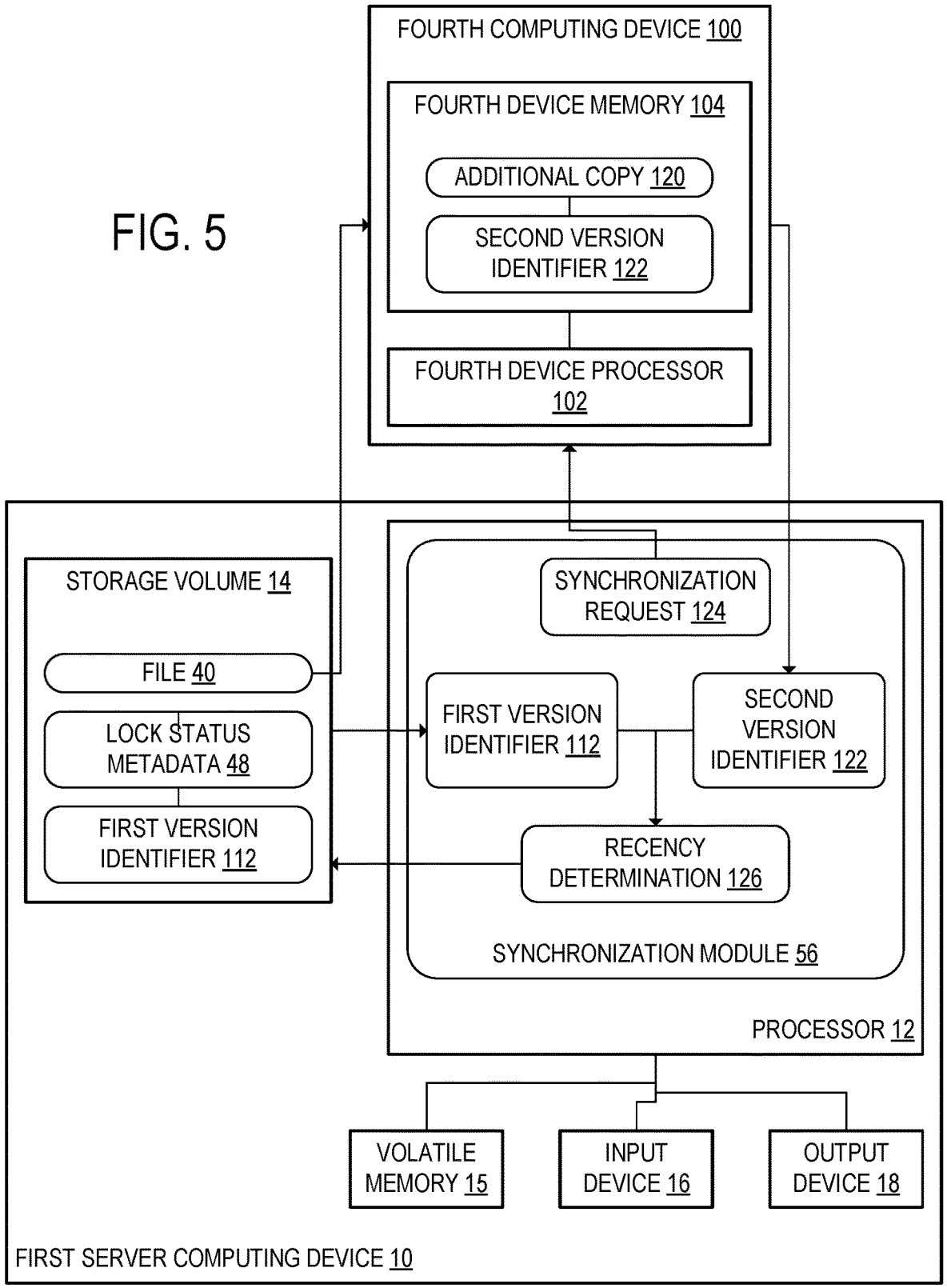
FIG. 5 shows the first server computing device when a synchronization request is sent to a fourth server computing device, according to the configuration of FIG. 1.

As shown in the example of FIG. 5, different versions of the file 40 stored at different computing devices may be synchronized. The synchronization of the different versions of the file 40 may be performed at a synchronization module 56 executed at the processor 12. The processor 12 may be further configured to store a first version identifier 112 of the file 40 in the storage volume 14. The processor 12 may be further configured to receive a second version identifier 122 of an additional copy 120 of the file 40 from a fourth server computing device 100. As shown in the example of FIG. 5, the fourth server computing device 100 may be a remote computing device including a fourth device processor 102 and fourth device memory 104. The fourth device memory 104 may store the additional copy 120 and the second version identifier 122 of the additional copy 120. In some examples, the second server computing device 20 or the third server computing device 30 shown in FIG. 1 may function as the fourth server computing device 100.

In some examples, the processor 12 may be configured to receive the second version identifier 122 in response to transmitting a synchronization request 124 to the fourth server computing device 100. For example, the processor 12 may be configured to transmit the synchronization request 124 for the second version identifier 122 to the fourth server computing device 100 at a predetermined time interval. In other examples, the processor 12 may be configured to transmit the synchronization request 124 to the fourth server computing device 100 after a modification to the file 40 has been performed.

The processor 12 may be further configured to make a recency determination 126 by comparing the first version identifier 112 to the second version identifier 122. For example, the first version identifier 112 and the second version identifier 122 may include respective timestamps, and the processor 12 may determine whether the timestamp included in the first version identifier 112 or the timestamp included in the second version identifier 122 is more recent.

When the processor 12 determines that the first version identifier 112 is more recent than the second version identifier 122, the processor 12 may, in response to this determination, be further configured to transmit the file 40 and the first version identifier 112 to the fourth server computing device 100. Thus, the additional copy 120 of the file 40 stored at the fourth server computing device 100 may be updated to reflect changes that have been made to the file 40 at the first server computing device 10.

Figure 6A:
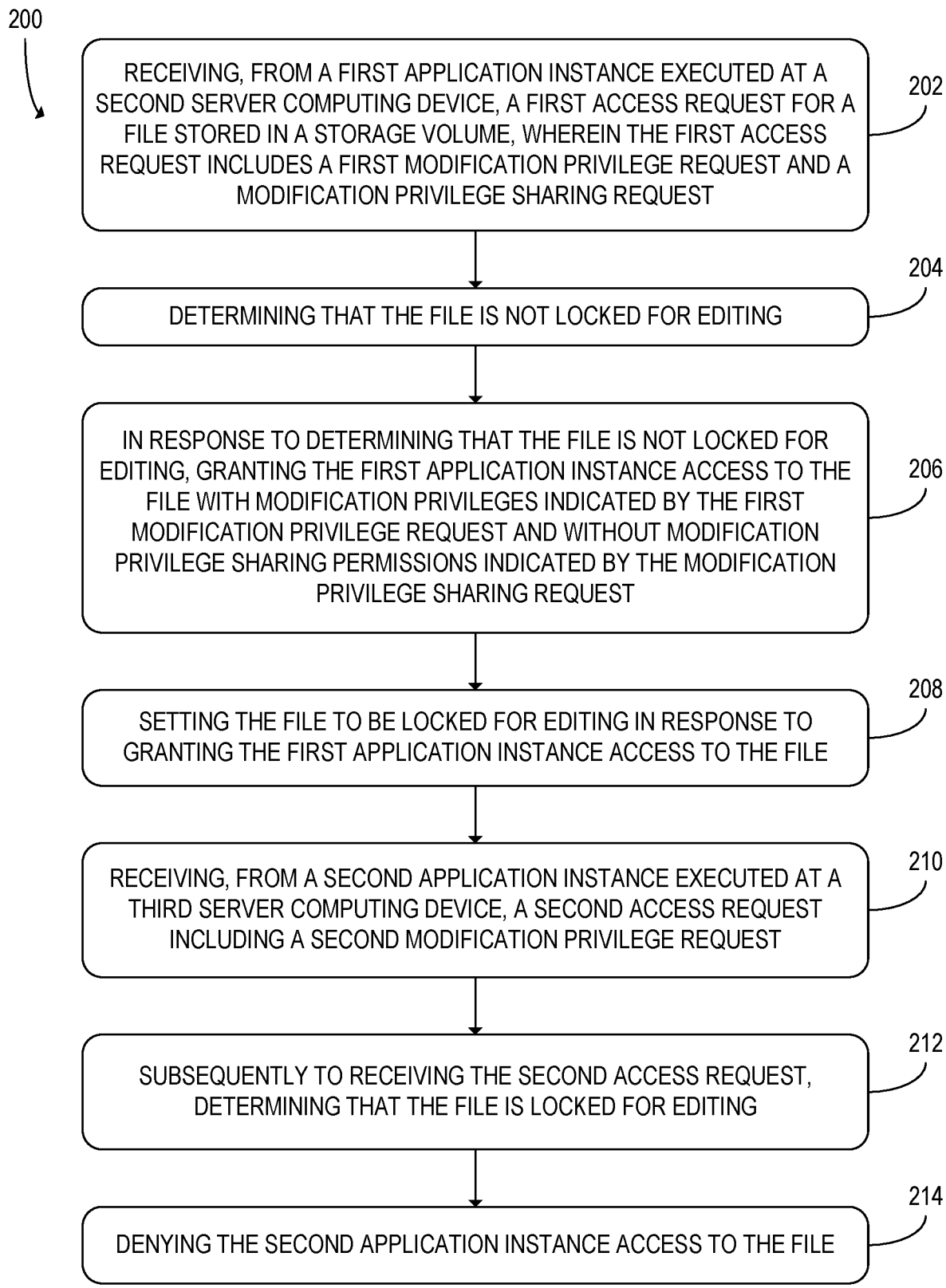
FIG. 6A shows a method that may be used with a first server computing device when implementing a distributed file management system such as shown in FIG. 1.

FIG. 6A shows a flowchart of an example method 200 for use with a computing device included in a distributed file management system. The computing device may, for example, be the first server computing device 10 of FIG. 1. At step 202, the method 200 may include receiving, from a first application instance executed at a second server computing device, an access request for a file stored in a storage volume. The first access request may include a modification privilege request for the first application instance to be given modification privileges for the file. The modification privileges may include edit privileges that allow an application program instance to make edits to the file. The modification privileges may additionally or alternatively include delete privileges that allow an application program instance to delete the file. In addition, the first access request may further include a modification privilege sharing request to receive modification privilege sharing permissions for the file. The modification privilege sharing permissions requested by the second server computing device may include edit privilege sharing permissions or delete privilege sharing permissions.

At step 204, the method 200 may further include determining that the file is not locked for editing. Determining that the file is not locked for editing may include retrieving lock status metadata for the file from the storage volume. In response to determining that the file is not locked for editing, the method 200 may further include, at step 206, granting the first application instance access to the file with modification privileges indicated by the first modification privilege request and without modification privilege sharing permissions indicated by the modification privilege sharing request. Thus, when the file is determined to not be checked out for editing at another computing device, the second server computing device may be allowed to open and modify the file. However, while the first application instance is accessing the file with the modification privileges, other application instances may be prevented from accessing the file with the modification privileges.

At step 208, the method 200 may further include setting the file to be locked for editing in response to granting the first application instance access to the file. Setting the file to be locked for editing may include modifying the lock status metadata stored in the storage volume.

At step 210, the method 200 may further include receiving, from a second application instance executed at a third server computing device, a second access request including a second modification privilege request. The second modification privilege request may, for example, be a request for edit privileges or delete privileges for the file.

Subsequently to receiving the second access request, the method 200 may further include, at step 212, determining that the file is locked for editing. The determination that the file is locked for editing may be made at least in part by querying the lock status metadata for the file. At step 214, the method 200 may further include denying the second application instance access to the file. Accordingly, conflicts between modifications to the file may be avoided by preventing the second application instance from opening the file with modification privileges when the file is locked for editing. In some examples, the second application instance may still be able to open the file without modification privileges while the file is locked for editing.

Figure 6B:
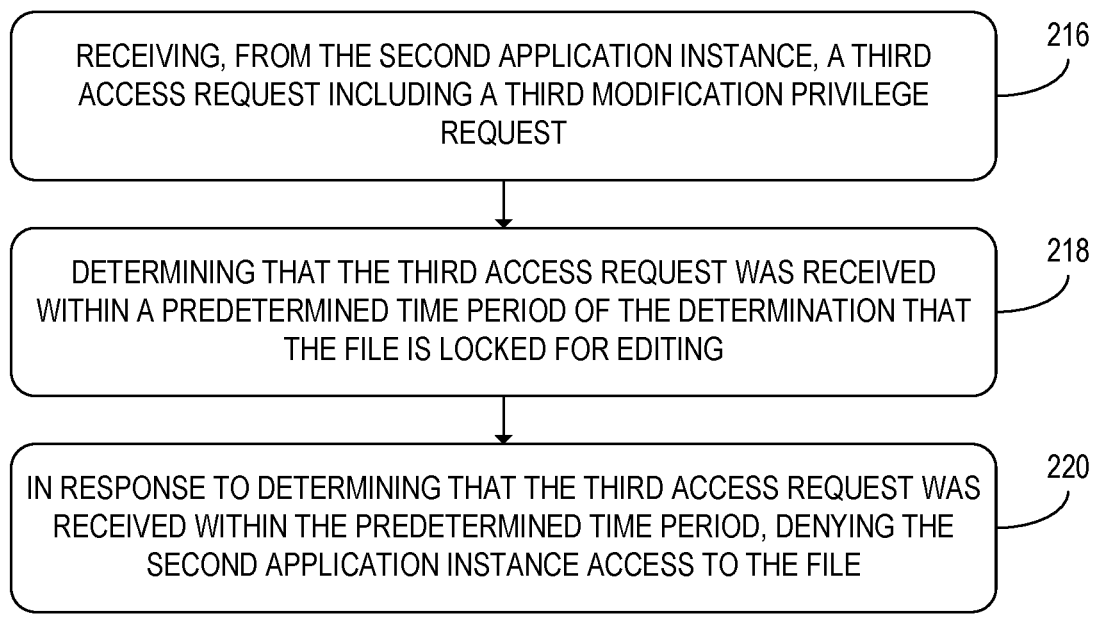
FIGS. 6B-6E show additional steps of the method of FIG. 6A in some examples.

FIGS. 6B-6E show additional steps of the method 200 that may be performed in some examples. As shown in FIG. 6B at step 216, the method 200 may further include receiving, from the second application instance, a third access request including a third modification privilege request for the file. At step 218, the method 200 may further include determining that the third access request was received within a predetermined time period of the determination that the file is locked for editing. At step 220, the method 200 may further include denying the second application instance access to the file in response to determining that the third access request was received within the predetermined time period. By denying the third access request when it is received within the predetermined time period, the processor of the computing device may avoid having to query the storage volume an additional time when the file is likely to still be locked for editing.

Figure 6C:
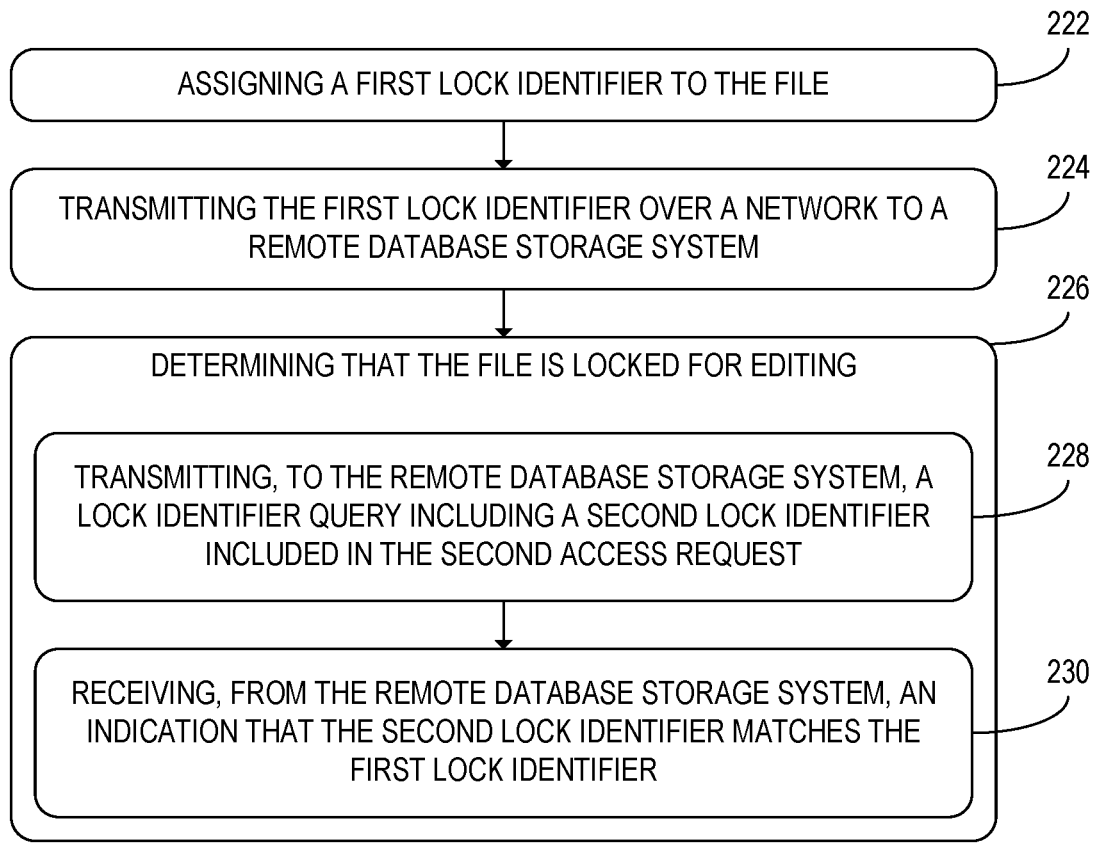

In some examples, as shown in FIG. 6C, indications that files are locked for editing may be stored remotely in a remote database storage system. In such examples, the method 200 may further include, at step 222, assigning a first lock identifier to the file. The first lock identifier may be a GUID for the file that is determined, for example, based on a file name and a parent directory of the file. At step 224, the method 200 may further include transmitting the first lock identifier over a network to a remote database storage system. Subsequently to transmitting the first lock identifier to the remote database storage system, the method 200 may further include, at step 226, determining that the file is locked for editing. Determining that the file is locked for editing may include, at step 228, transmitting a lock identifier query to the remote database storage system. The lock identifier query may include a second lock identifier included in the second access request. The second lock identifier may be an identifier of the file to which the second application instance is requesting access. Subsequently to transmitting the lock identifier query to the remote database storage system, determining that the file is locked for editing may further include, at step 230, receiving an indication from the remote database storage system that the second lock identifier matches the first lock identifier. The match between the first lock identifier and the second lock identifier may indicate that the file to which the second application instance is requesting access is already locked for editing.

Figure 6D:
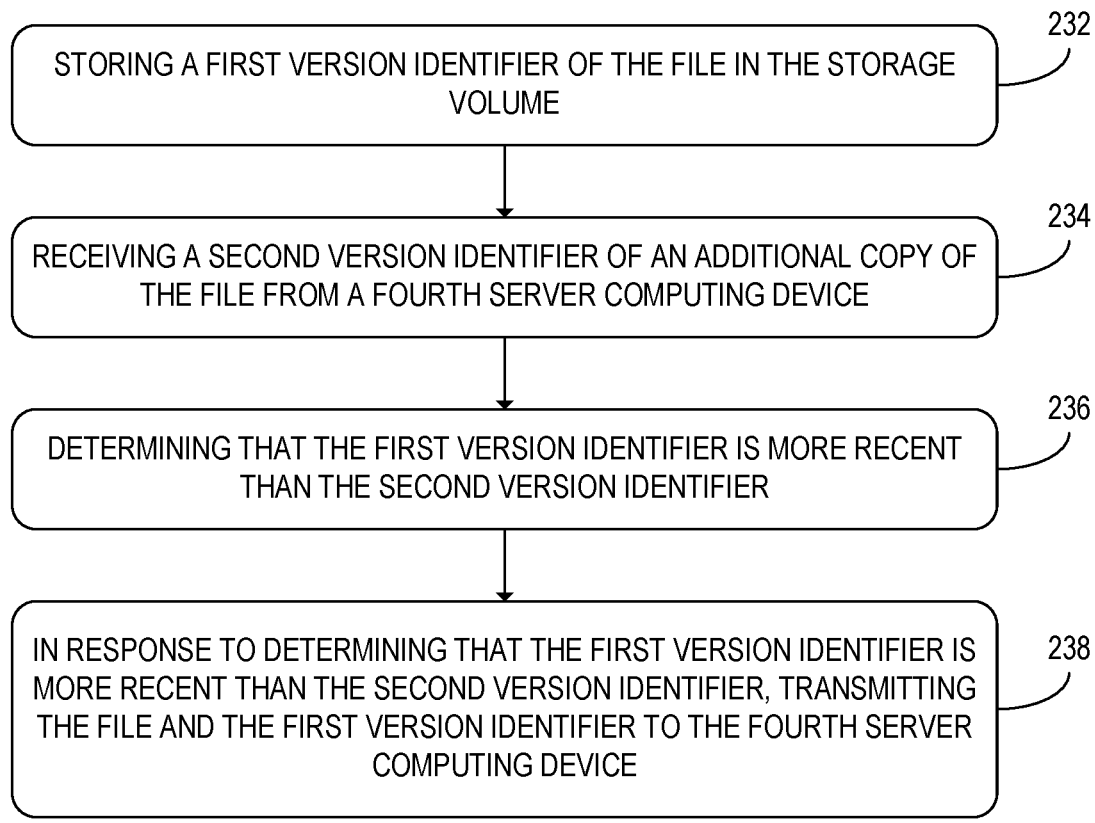

As shown in FIG. 6D, the method 200 may further include, at step 232, storing a first version identifier of the file in the storage volume. The version identifiers assigned to versions of a file may be sequential indicators such as timestamps. At step 234, the method 200 may further include receiving a second version identifier of an additional copy of the file from a fourth server computing device. In some examples, the second server computing device or the third server computing device may function as the fourth server computing device when the steps of FIG. 6D are performed. At step 236, the method 200 may further include determining that the first version identifier is more recent than the second version identifier. In response to determining that the first version identifier is more recent than the second version identifier, the method 200 may further include, at step 238, transmitting the file and the first version identifier to the fourth server computing device. Thus, when the additional copy stored at the fourth server computing device is a copy of an older version of the file, the additional copy may be replaced with a more recent version of the file.

Figure 6E:
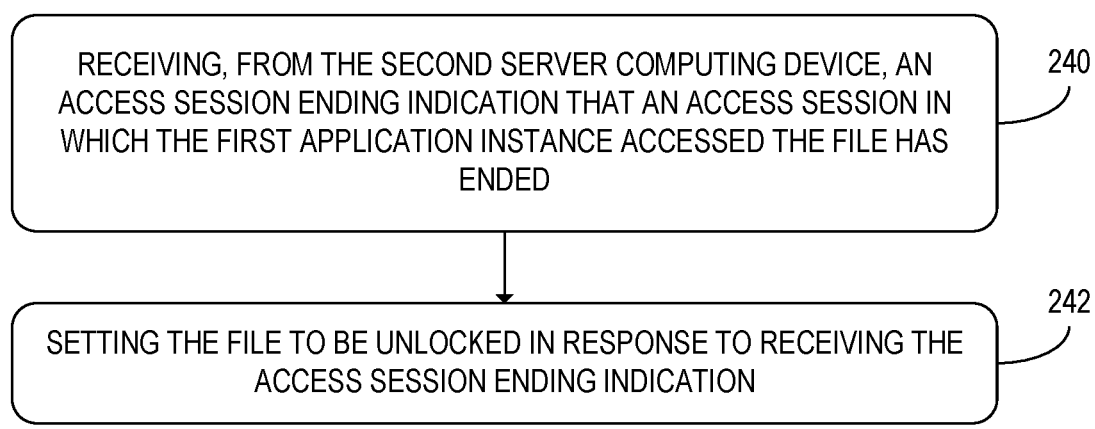

At step 240, as shown in FIG. 6E, the method 200 may further include receiving, from the second server computing device, an access session ending indication that an access session in which the first application instance accessed the file has ended. At step 242, the method 200 may further include setting the file to be unlocked in response to receiving the access session ending indication. In examples in which the steps of FIG. 6C are performed, setting the file to be unlocked may include transmitting an unlock notification to the remote database storage system. Additionally or alternatively, setting the file to be unlocked may include modifying the lock status metadata stored in the storage volume.

Figure 7:
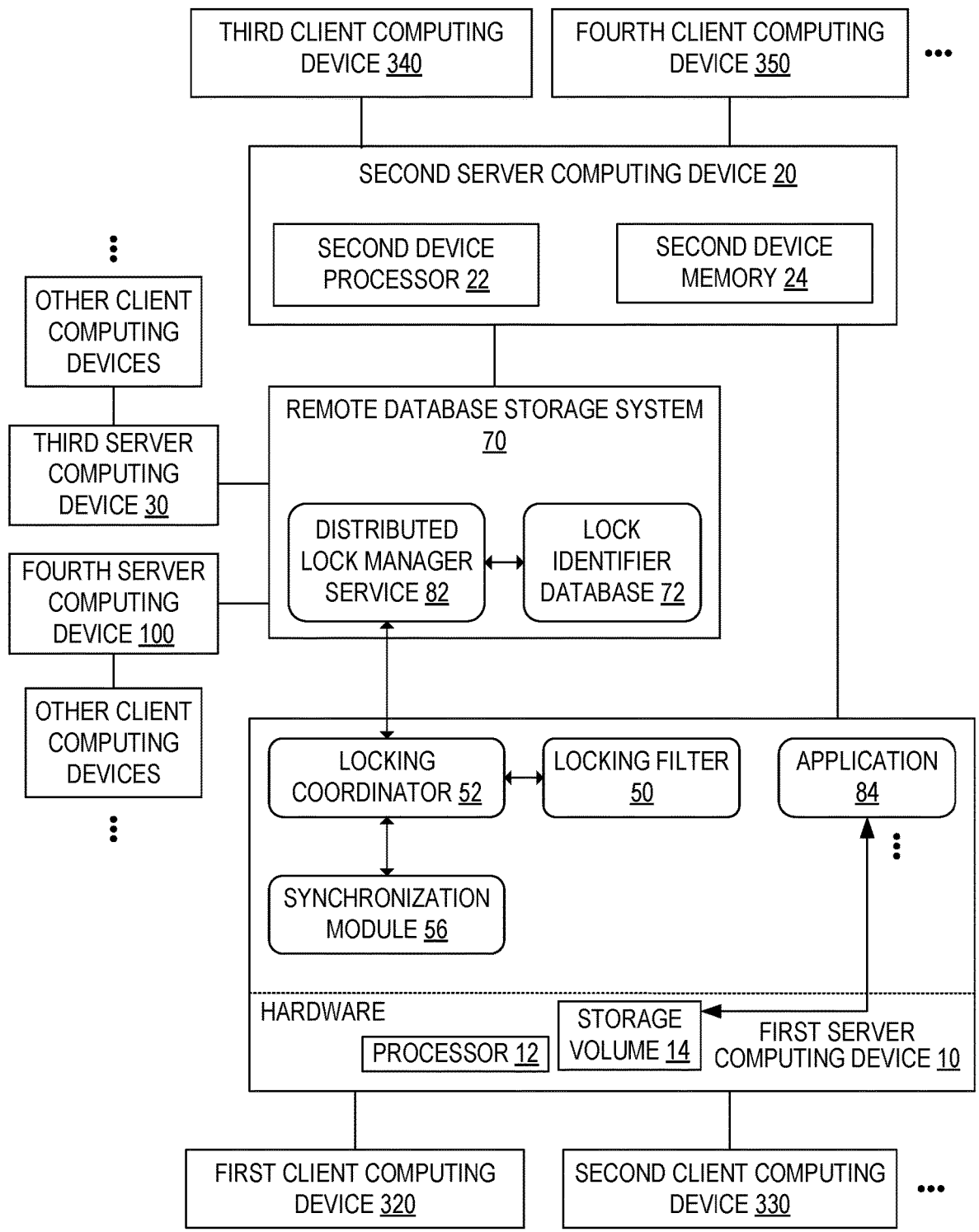
FIG. 7 schematically shows an example configuration of the first server computing device, the second server computing device, the third server computing device, and the remote database storage system, according to the configuration of FIG. 1.

FIG. 7 schematically shows an example configuration of the first server computing device 10, the second server computing device 20, and the remote database storage system 70. The first server computing device 10 and the second server computing device 20 are both configured to communicate with the remote database storage system 70. In addition, FIG. 7 shows a first client computing device 320 and a second client computing device 330 that are configured to communicate with the first server computing device 10, and a third client computing device 330 and a fourth client computing device 340 that are configured to communicate with the second server computing device 20. The client computing devices 320, 330, 340, and 350 may each be configured to access at least a portion of the file 40 via their respective server computing devices.

It will be appreciated that the first server computing device 10, second server computing device 20, and third server computing device 30, can each be servers deployed in the same or different data centers in a distributed file management server system, of which remote database storage system 70 is a part. Thus, the distributed file management server system can be configured to offer users and organizations file shares in the cloud that are distributed across multiple servers, and the techniques described herein can be used to perform locking operations on synced files stored in the multiple servers in the cloud file share. In addition, the execution of one or more applications 84 may be distributed across multiple computing devices, and one or more files may be shared between instances of the one or more applications 84 using the distributed file management server system.

In an alternative configuration, the first server computing device 10, the second server computing device 20, and the third server computing device 30 may be deployed outside of data center environments, while the remote database storage system 70 may be deployed as a cloud service in a data center.

Using the systems and methods discussed above, computing devices included in a distributed file management system may be granted access to files while avoiding conflicts that would result if multiple computing devices made concurrent modifications to a file or to the file structure of a folder. In addition, the file may be synchronized between the computing devices in order to maintain version consistency. The identifiers that may be associated with files may also prevent namespace collisions from occurring when multiple application instances are accessing the same directory.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
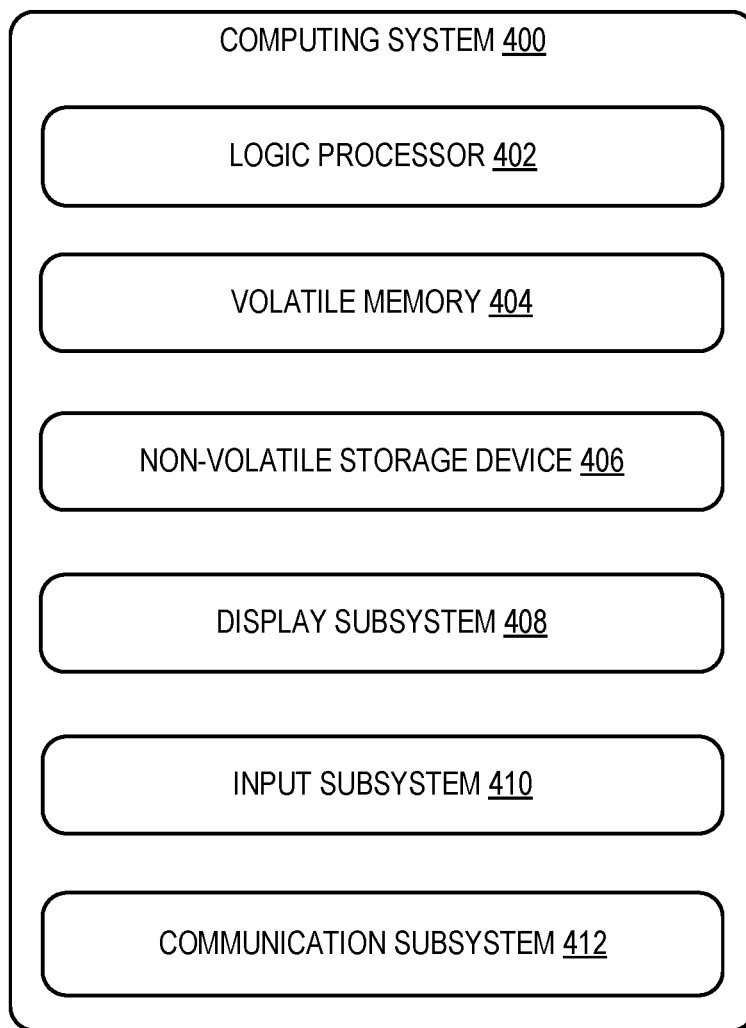
FIG. 8 shows a schematic view of an example computing environment in which the first server computing device of FIG. 1 may be enacted.

FIG. 8 schematically shows a non-limiting embodiment of a computing system 400 that can enact one or more of the methods and processes described above. Computing system 400 is shown in simplified form. Computing system 400 may embody the first server computing device 10 described above and illustrated in FIG. 1. Computing system 400 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 8.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A first physical server computing device comprising:
a processor configured to:
receive, from a first application instance executed at a second server computing device, a first access request for a file stored in a storage volume, wherein the first access request includes a first modification privilege request and a modification privilege sharing request, wherein the modification privilege sharing request comprises a request to share modification privileges with one or more other application instances;
determine that the file is not locked for editing;
in response to determining that the file is not locked for editing, grant the first application instance access to the file with modification privileges indicated by the first modification privilege request and without modification privilege sharing permissions indicated by the modification privilege sharing request;
set the file to be locked for editing in response to granting the first application instance access to the file;
receive, from a second application instance executed at a third server computing device, a second access request including a second modification privilege request;
subsequently to receiving the second access request, determine that the file is locked for editing; and
deny the second application instance access to the file.

2. The first physical server computing device of claim 1, wherein the modification privileges include delete privileges.

3. The first physical server computing device of claim 1, wherein the processor is further configured to:
receive, from the second application instance, a third access request including a third modification privilege request;
determine that the third access request was received within a predetermined time period of the determination that the file is locked for editing; and in response to determining that the third access request was received within the predetermined time period, deny the second application instance access to the file.

4. The first physical server computing device of claim 1, wherein the processor is further configured to:
assign a first lock identifier to the file; and
transmit the first lock identifier over a network to a remote database storage system.

5. The first physical server computing device of claim 4, wherein:
the second access request includes a second lock identifier; and
the processor is further configured to determine that the file is locked for editing at least in part by:
transmitting, to the remote database storage system, a lock identifier query including the second lock identifier; and
receiving, from the remote database storage system, an indication that the second lock identifier matches the first lock identifier.

6. The first physical server computing device of claim 1, wherein the modification privilege sharing permissions include edit privilege sharing permissions or delete privilege sharing permissions.

7. The first physical server computing device of claim 1, wherein the processor is further configured to:
store a first version identifier of the file in the storage volume;
receive a second version identifier of an additional copy of the file from a fourth server computing device;
determine that the first version identifier is more recent than the second version identifier; and
in response to determining that the first version identifier is more recent than the second version identifier, transmit the file and the first version identifier to the fourth server computing device.

8. The first physical server computing device of claim 1, wherein:
the first access request further includes a file structure modification privilege request for a folder in which the file is located; and
the processor is further configured to grant file structure modification privileges to the first application instance in response to determining that the file is not locked for editing.

9. The first physical server computing device of claim 8, wherein:
the modification privilege sharing request further includes a file structure modification privilege sharing permission request; and
the processor is configured to grant the first application instance access to the file without the granting the first application instance file structure modification privilege sharing permissions indicated by the file structure modification privilege sharing permission request.

10. The first physical server computing device of claim 1, wherein the processor is further configured to:
receive, from the second server computing device, an access session ending indication that an access session in which the first application instance accessed the file has ended; and
set the file to be unlocked in response to receiving the access session ending indication.

11. The first physical server computing device of claim 1, wherein the processor is further configured to transmit a notification to the third server computing device indicating that an invalid access mode has been selected when the processor denies the second application instance access to the file.

12. A method for use with a first server computing device, the method comprising:
receiving, from a first application instance executed at a second server computing device, a first access request for a file stored in a storage volume, wherein the first access request includes a first modification privilege request and a modification privilege sharing request, wherein the modification privilege sharing request comprises a request to share modification privileges with one or more other application instances;
determining that the file is not locked for editing;
in response to determining that the file is not locked for editing, granting the first application instance access to the file with modification privileges indicated by the first modification privilege request and without modification privilege sharing permissions indicated by the modification privilege sharing request;
setting the file to be locked for editing in response to granting the first application instance access to the file;
receiving, from a second application instance executed at a third server computing device, a second access request including a second modification privilege request;
subsequently to receiving the second access request, determining that the file is locked for editing; and
denying the second application instance access to the file.

13. The method of claim 12, wherein the modification privileges include delete privileges.

14. The method of claim 12, further comprising:
receiving, from the second application instance, a third access request including a third modification privilege request;
determining that the third access request was received within a predetermined time period of the determination that the file is locked for editing; and
in response to determining that the third access request was received within the predetermined time period, denying the second application instance access to the file.

15. The method of claim 14, further comprising:
assigning a first lock identifier to the file;
transmitting the first lock identifier over a network to a remote database storage system; and
determining that the file is locked for editing at least in part by:
transmitting, to the remote database storage system, a lock identifier query including a second lock identifier included in the second access request; and
receiving, from the remote database storage system, an indication that the second lock identifier matches the first lock identifier.

16. The method of claim 12, wherein the modification privilege sharing permissions include edit privilege sharing permissions or delete privilege sharing permissions.

17. The method of claim 12, further comprising:
storing a first version identifier of the file in the storage volume;
receiving a second version identifier of an additional copy of the file from a fourth server computing device;
determining that the first version identifier is more recent than the second version identifier; and
in response to determining that the first version identifier is more recent than the second version identifier, transmitting the file and the first version identifier to the fourth server computing device.

18. The method of claim 12, wherein:
the first access request further includes a file structure modification privilege request for a folder in which the file is located; and
the method further includes granting file structure modification privileges to the first application instance in response to determining that the file is not locked for editing.

19. The method of claim 18, wherein:
the modification privilege sharing request further includes a file structure modification privilege sharing permission request; and
the method further includes granting the first application instance access to the file without the granting the first application instance file structure modification privilege sharing permissions indicated by the file structure modification privilege sharing permission request.

20. A first physical server computing device comprising:
a processor configured to:
receive, from a first application instance, a first access request for a file stored in a storage volume, wherein:
the first access request includes a first modification privilege request for modification privileges and a modification privilege sharing request for modification privilege sharing permissions, wherein the modification privilege sharing request comprises a request to share modification privileges with one or more other application instances;
the modification privileges include edit privileges and delete privileges; and
the modification privilege sharing permissions include edit privilege sharing permissions and delete privilege sharing permissions;
determine that the file is not locked for editing;
in response to determining that the file is not locked for editing, grant the first application instance access to the file with the modification privileges indicated by the first modification privilege request and without the modification privilege sharing permissions indicated by the modification privilege sharing request;
set the file to be locked for editing in response to granting the first application instance access to the file;
receive, from a second application instance, a second access request including a second modification privilege request;
subsequently to receiving the second access request, determine that the file is locked for editing;
deny the second application instance access to the file.

* * * * *